United States Patent
Stöbich

(10) Patent No.: US 11,560,054 B2
(45) Date of Patent: Jan. 24, 2023

(54) METHOD FOR OPERATING A DRIVE TRAIN OF A VEHICLE

(71) Applicant: ZF Friedrichshafen AG, Friedrichshafen (DE)

(72) Inventor: Alexander Stöbich, Wegscheid (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 315 days.

(21) Appl. No.: 16/732,647

(22) Filed: Jan. 2, 2020

(65) Prior Publication Data

US 2020/0215910 A1 Jul. 9, 2020

(30) Foreign Application Priority Data

Jan. 8, 2019 (DE) ...................... 10 2019 200 125.4

(51) Int. Cl.
| | |
|---|---|
| *B60K 25/06* | (2006.01) |
| *B60W 30/18* | (2012.01) |
| *B60W 10/11* | (2012.01) |
| *B60W 10/06* | (2006.01) |
| *B60W 40/105* | (2012.01) |

(52) U.S. Cl.
CPC ............ *B60K 25/06* (2013.01); *B60W 10/06* (2013.01); *B60W 10/11* (2013.01); *B60W 30/18009* (2013.01); *B60W 30/18027* (2013.01); *B60W 40/105* (2013.01); *B60W 2300/15* (2013.01)

(58) Field of Classification Search
None
See application file for complete search history.

(56) References Cited

U.S. PATENT DOCUMENTS

| | | | |
|---|---|---|---|
| 4,823,645 A | | 4/1989 | Gaus et al. |
| 4,880,070 A | * | 11/1989 | Irikura .................. B60K 17/28 180/53.1 |
| 5,738,606 A | * | 4/1998 | Bellinger ............. B60W 10/06 477/111 |
| 2022/0016974 A1 | * | 1/2022 | Burjes .................. B60W 10/30 |

FOREIGN PATENT DOCUMENTS

| | | | |
|---|---|---|---|
| DE | 36 32 965 C1 | 9/1987 | |
| DE | 103 13 482 A1 | 10/2004 | |
| DE | 10 2005 001 526 A1 | 7/2006 | |
| EP | 2560855 B1 * | 4/2017 | ............ B60W 10/02 |

OTHER PUBLICATIONS

German Search Report Corresponding to 10 2019 200 125.4 dated Sep. 24, 2019.

* cited by examiner

*Primary Examiner* — Faye M Fleming
(74) *Attorney, Agent, or Firm* — Finch & Maloney PLLC

(57) ABSTRACT

A method for operating a drive-train of a vehicle, such as a municipal or agricultural utility vehicle, having at least one drive machine, a vehicle transmission with at least two gears, at least one drive axle and at least one auxiliary power take-off. The method includes controlling or regulating a supply of normal power from the drive machine as a function of a normal torque characteristic. Depending on the operating situation, supplying additional power to the at least one drive axle and/or to the at least one auxiliary power take-off. The supplied additional power is controlled or regulated as a function of operating situation dependent torque characteristics which are called up as a function of the selected gear at the time.

10 Claims, 4 Drawing Sheets

METHOD FOR OPERATING A DRIVE TRAIN OF A VEHICLE

This application claims priority from German patent application serial no. 10 2019 200 125.4 filed Jan. 8, 2019.

FIELD OF THE INVENTION

The invention relates to a method for operating a drive-train of a vehicle, in particular a municipal or agricultural utility vehicle, having at least one drive machine, a vehicle transmission with at least two gears, at least one drive axle and at least one auxiliary power take-off, such that from the drive machine a normal power is supplied which is controlled or regulated as a function of a normal torque characteristic, so that depending on the operating situation additional power is provided to the at least one drive axle and/or to the at least one auxiliary power take-off. In addition the invention relates to a control unit designed to carry out the method, and a corresponding computer program product.

BACKGROUND OF THE INVENTION

In a vehicle drive-train, particularly in the case of municipal or agricultural vehicles, the vehicle transmission is an assembly that limits the power supplied by the drive machine. Whereas for a defined performance range of vehicles in different performance classes a drive machine that covers the performance range concerned is used, the vehicle transmissions are designed specifically for each performance class.

If a vehicle is built with a so-termed power-boost function, i.e. a function for calling up additional power, then depending on the operating condition of the vehicle transmission additional power is made available in the area of the drive machine for certain operating situations, at least temporarily, provided that the vehicle transmission will not be overloaded by this additionally provided power. For example a power-boost function is activated during a so-termed PTO (power take-off) operation or during a transport operation of an agricultural vehicle such as a tractor. In such a case, for example during the PTO operation of a tractor, an auxiliary drive in the form of a splined shaft is connected to the drive-train of the tractor in order to be able to drive a secondary consumer that is functionally connected to the splined shaft. During this the drive machine is controlled by means of stored torque characteristics which are used by a control unit associated with it. During normal operation of the drive-train, i.e. without any activation of the power-boost function, a normal amount of power that is considered to be appropriate for the design of the vehicle transmission is supplied, the power being controlled or regulated as a function of a normal torque characteristic. When the power-boost function is activated additional power is supplied by the drive machine, so that the power temporarily provided is higher than the normal power.

A method of the type mentioned at the beginning is known from DE 10 2005 001 526 A1.

SUMMARY OF THE INVENTION

Starting from the prior art described above, it is now the purpose of the present invention to further develop a method for operating a drive-train of a vehicle, the method enabling a more efficient operating mode when the supply of additional power has been activated.

From the process-technological standpoint, this objective is achieved with the characterizing features of the independent claim(s). A control unit and a computer program product are also the object of the independent claims. The dependent claims that follow in each case, respectively describe advantageous further developments of the invention.

According to the invention, a method for operating a drive-train of a vehicle, in particular a municipal or agricultural utility vehicle, is proposed. The drive-train comprises at least a drive machine, a vehicle transmission with at least two gears, at least one drive axle and at least one auxiliary power take-off. The drive machine supplies on its output side a normal power which is controlled or regulated as a function of a normal torque characteristic, whereas additional power is supplied to the at least one drive axle and/or the at least one auxiliary power take-off depending on the operating situation. For more efficient operation when the provision of additional power is activated, it is proposed according to the invention that the additional power supplied is controlled or regulated as a function of operating situation dependent torque characteristics which are called up as a function of the gear selected at the time. To each gear is assigned at least one specific torque characteristic, with reference to which the drive machine is controlled or regulated. This has the advantage that the additional power supplied by the drive machine in each case, which is delivered to the vehicle transmission, is matched to the performance capability of the gear concerned. In particular, components of the lower gears of the vehicle transmission, i.e. especially gearwheels and bearings, limit the additional power that the vehicle transmission can receive from the drive machine on its input side without damaging the vehicle transmission. The present invention ensures that when additional power is called for in any selected gear, only as much power is supplied as each individual gear can at most transmit, having regard to its dimensions. Thereby, in any operating situation in which additional power has to be supplied, the vehicle can be operated at the limit of its power without overloading the drive-train or the vehicle transmission. Thus, besides optimizing the performance, the gear-dependent control or regulation of the drive machine contributes toward increasing the useful life of the drive-train.

Preferably, for the operating situation dependent provision of additional power the activation of the at least one auxiliary power take-off and a driving speed of the vehicle can be monitored. With reference to these criteria it can be determined which of the torque characteristics is used for the control or regulation of the drive machine.

Thus, in an operating situation of the vehicle in which the at least one auxiliary power take-off is inactive and the vehicle is being operated at a driving speed below a driving speed limit, the drive machine can be controlled or regulated as a function of the normal torque characteristic regardless of the gear selected. When the conditions are satisfied, the normal torque characteristic can be used in any operating situation of the vehicle and any available gear of the vehicle transmission, without restriction.

Furthermore, in an operating situation of the vehicle in which the at least one auxiliary power take-off is inactive and the vehicle is being operated at a driving speed above a driving speed limit, the drive machine can be controlled or regulated as a function of a gear-specific transport torque characteristic used as an operating situation dependent torque characteristic. However, the operation of the vehicle with an inactive auxiliary power take-off but at a driving speed above a driving speed limit generally takes place in the context of a transport journey on a paved surface that permits high driving speeds. The reaching of high driving speeds presupposes a high engine rotational speed, i.e. a high gear. Thus, during a transport journey of the vehicle additional power can be called for from the drive machine when the driving speed limit is exceeded, and in such a case a gear-specific transport torque characteristic is used for controlling the drive machine.

In a preferred further development, in an operating situation of the vehicle in which the at least one auxiliary power take-off is active and the vehicle is being operated at a minimum driving speed below a driving speed limit, the drive machine can be controlled or regulated as a function of a gear-specific auxiliary power take-off torque characteristic used as the torque characteristic. Such an operating situation occurs, for example, when operating a working accessory or a trailer towed by the vehicle, which is connected to the at least one auxiliary power take-off. By virtue of the movement of the vehicle sufficient lubrication of the components of the vehicle transmission is obtained, which permits the drive-train to be operated at the power limit in the gear concerned, as specified by the respective gear-specific auxiliary power take-off torque characteristic.

In the case of an operating situation of the vehicle in which the at least one auxiliary power take-off is active but the driving speed of the vehicle is zero, the drive machine can be controlled or regulated in a gear-specific manner as a function of the auxiliary power take-off torque characteristics, but using a reduction factor. In this operating situation, in which the vehicle is stationary, lubrication of the components of the vehicle transmission may not be sufficient to enable the drive-train to be operated at the power limit in the gear concerned as a function of the auxiliary power take-off torque characteristics. By applying the reduction factor to the gear-specific auxiliary power take-off torque characteristic concerned, it is ensured that additional power can be called for while the torque is above the normal torque characteristic but below the gear-specific auxiliary power take-off torque characteristic relevant at the time.

According to a preferred embodiment, the vehicle transmission can comprise at least two synchronous gears and at least two powershiftable gears, whose selection calls for an operating situation dependent, gear-specific torque characteristic for controlling or regulating the drive machine. In such a case a number of gear-specific torque characteristics, i.e. a transport torque characteristic and auxiliary power take-off torque characteristics, the number of characteristics increased by a factor corresponding to the number of powershiftable gears can be stored in such manner that they can be recalled, whereby the gear-specific provision of the operating situation dependent additional power can be adjusted more precisely.

The invention also relates to a control unit for controlling a drive-train of a vehicle, in particular a municipal or agricultural utility vehicle.

To achieve the objective stated at the beginning, according to the independent claim(s) a control unit is provided for controlling a drive-train of a vehicle, in particular a municipal or agricultural utility vehicle, the drive-train comprising at least one drive machine, a vehicle transmission with at least two gears, at least one drive axle and at least one auxiliary power take-off, wherein the drive machine supplies a normal power which the control unit controls or regulates as a function of a normal torque characteristic, in such a way that in an operating situation dependent manner the drive machine can deliver additional power to the at least one drive axle and/or to the at least one auxiliary power take-off.

The control unit is designed to control or regulate the additional power supplied, as a function of operating situation dependent torque characteristics which are called up as a function of the gear selected.

In particular the control unit can be designed to carry out a method according to one or more of the claims. The control unit comprises a memory unit and a computer unit which controls the drive machine with reference to the torque characteristics, the normal torque characteristic and the gear-specific torque characteristics stored in the memory unit.

The system according to the invention can also be incorporated as a computer program product with program code means for implementing a method for operating a drive-train of a vehicle according to one or more of the claim(s), when the computer program product is run on a computer or on a corresponding computing unit, in particular a control unit according to the claims.

The invention is not limited to the combination of features indicated in the independent claims or the claims that depend on them. There are in addition options for combining individual features with one another so long as they emerge from the claims, the description of preferred embodiments of the invention given below, or directly from the drawings. References in the claims to the drawings by the use of indexes are not intended to restrict the protective scope of the claims.

BRIEF DESCRIPTION OF THE DRAWINGS

An advantageous embodiment of the invention, which will be explained below, is illustrated in the drawings, which show.

DETAILED DESCRIPTION OF THE PREFERRED EMBODIMENTS

Figure 1:
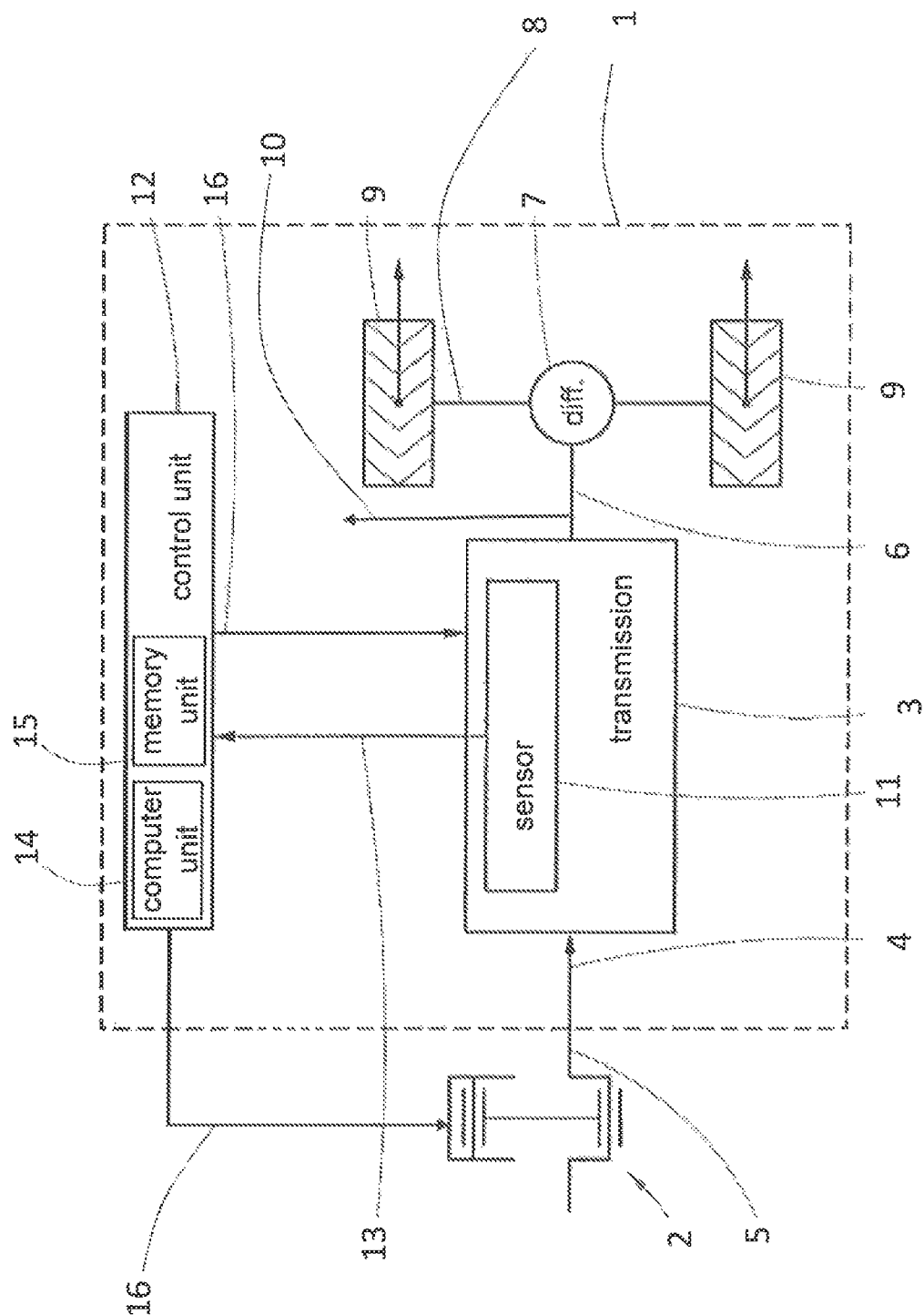
FIG. 1: A schematic representation of a drive-train of a vehicle.

The illustration in FIG. 1 shows a schematic representation of a drive-train 1 of a vehicle, in particular a municipal or agricultural utility vehicle, which comprises a vehicle transmission 3. The drive-train 1 can be coupled to a drive machine 2. For this, the drive-train 1 shown in FIG. 1 has an input shaft 4 of the vehicle transmission 3 which—depending on the specific design of the vehicle transmission 3—can be coupled directly or indirectly, for example by way of a starting element or a starting clutch, to an output shaft 5 of the drive machine 2.

The drive-train 1 also comprises an output shaft 6 of the vehicle transmission 3, which is coupled to a differential 7. On the output side, in the drive-train 1 shown here the differential 7 is coupled by a drive axle 8 to respective wheel drives 9 which are represented schematically in FIG. 1 by corresponding tires. Obviously, in other example embodiments more complex drive-trains 1 can also be created, in which for example more than two wheels can be or are coupled to the drive motor 2 by means of corresponding wheel drives 9 and/or differentials 7 so that they can be driven.

The drive-train 1 also comprises an auxiliary power take-off 10 (PTO=Power Take-off), which can for example be a power take-off shaft of the vehicle, such as an agricultural machine or a tractor. In the example embodiment of the drive-train 1 shown here, the auxiliary power take-off 10 branches off from the output shaft 6 of the vehicle transmission 3. Thus, this is a rear PTO. Likewise, in an example embodiment, drive-trains 1 can also have more than one auxiliary power take-off 10. This can be advantageous, for example, when the working machine concerned, such as a tractor, is equipped with a front and/or a rear PTO shaft.

In addition the transmission 3 and the drive-train 1 comprise at least one sensor 11, which is designed with regard to its function and arrangement, such that an input power, an input torque and/or an input rotational speed of the input shaft 4 of the vehicle transmission 3 can be detected by the sensor 11. Thus, directly or indirectly, the sensor 11 is a measuring device for determining the power.

In this case the sensor 11 is coupled to a control unit 12. The control unit 12 can for example be a vehicle control computer. By way of a sensor signal 13, the sensor 11 transmits to the control unit 12 the values it has determined. The control unit 12 contains a computer unit 14 and a memory unit 15. In the memory unit 15, among other things torque characteristics are stored, which serve for the control of the drive machine 2 by the control unit 12 as will be explained in greater detail below. The control unit 12 transmits corresponding control signals 16 to the drive machine 2. The control unit 12 can also transmit control signals to the vehicle transmission 3.

In the drive-train 1, the vehicle transmission 3 is an assembly which limits the power supplied by the drive machine 2. Whereas for a defined performance range of vehicles in different performance classes a drive machine that covers that performance range is used, the vehicle transmissions are designed specifically for each performance class.

Figure 2:
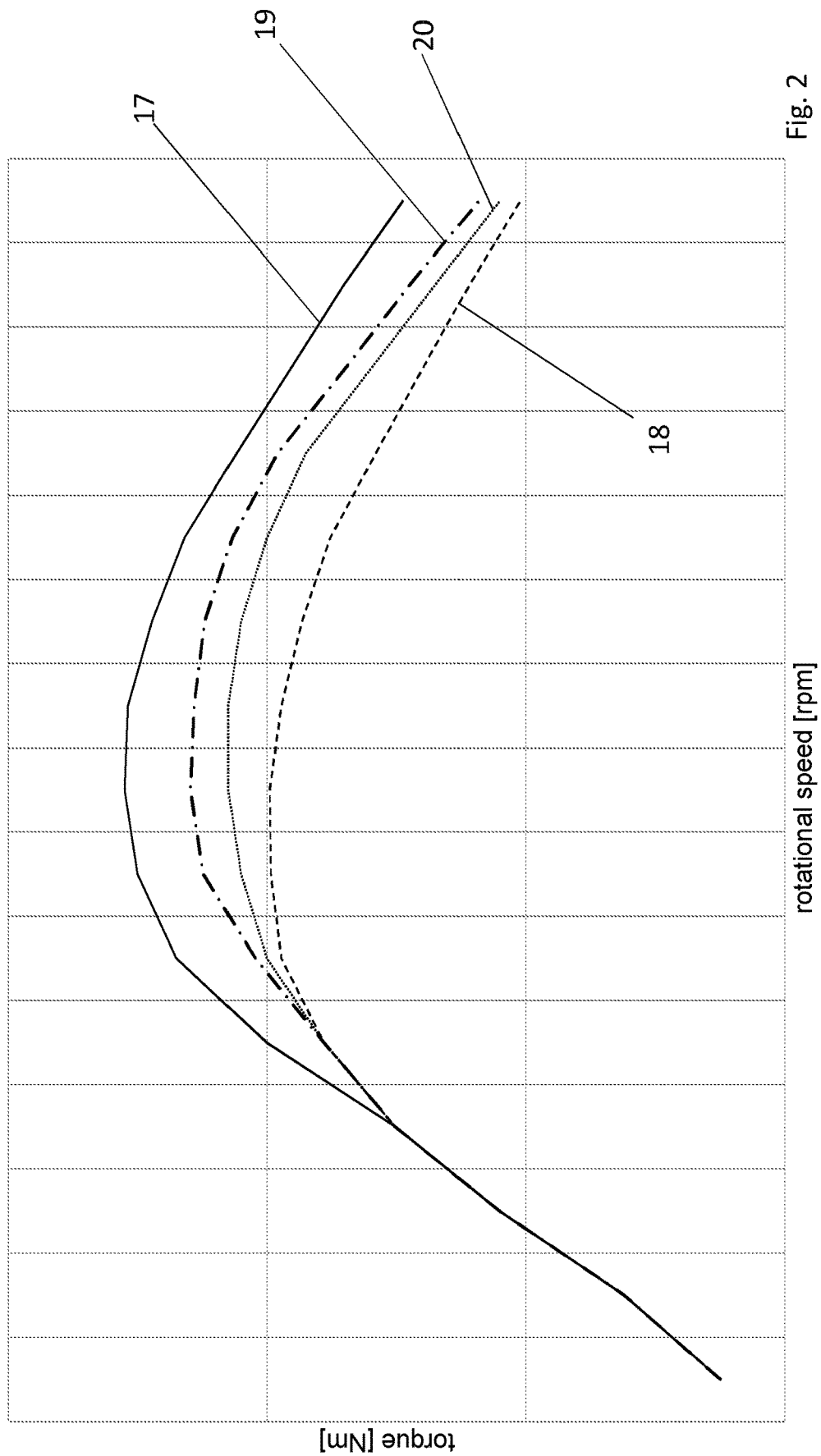
FIG. 2: As an example, a diagram in which a motor characteristic of a drive machine of the drive-train, a normal torque characteristic, a transport torque characteristic and an auxiliary power take-off torque characteristic of the vehicle transmission are compared.

The drive machine 2 is controlled by the control unit 12, in which at least one motor characteristic 17 is stored. The representation in FIG. 2 shows as an example a diagram in which the motor characteristic 17, a normal torque characteristic 18, a transport torque characteristic 19 and an auxiliary power take-off torque characteristic 20 of the drive machine 2 are compared. The vehicle transmission 3 has at least two synchronous gears and in the present example embodiment four synchronous gears. When no additional power is called for, the operation of the drive machine 2 takes place in this case for each gear selected, in accordance with the shape of the normal torque characteristic 18. The torque variation in each of the four synchronous gears corresponds to the course of the normal torque characteristic 18.

The transport torque characteristic 19 and the auxiliary power take-off torque characteristic 20 take their course after a specific rotational speed above the normal torque characteristic 18 has been reached. Thus, operation of the drive machine 2 using the transport torque characteristic 19 or the auxiliary power take-off torque characteristic 20 enables a higher drive power to be called for from the drive machine 2, depending on the operating situation, than is the case if the drive machine 2 were controlled or regulated in accordance with the auxiliary power take-off torque characteristic 20.

For the operating situation dependent supply of the additional power, the activation of the at least one auxiliary power take-off 10 and a driving speed of the vehicle are monitored. With reference to these criteria it can be determined which of the torque characteristics 18, 19, 20 stored in the memory unit 15 should be used for the drive machine 2 for control or regulation by the control unit 12.

In an operating situation of the vehicle in which the at least one auxiliary power take-off 10 is inactive and the vehicle is being operated at a driving speed lower than a driving speed limit, the drive machine 2 is controlled or regulated as a function of the normal torque characteristic 18 regardless of the gear selected in the vehicle transmission 3. In other words, the normal torque characteristic 18 is followed in any of the four gears.

In an operating situation of the vehicle in which the at least one auxiliary power take-off 10 is inactive and the vehicle is being operated at a driving speed higher than a driving speed limit, the drive machine 2 is controlled or regulated as a function of the transport torque characteristic 19 as the operating situation dependent torque characteristic.

In an operating situation of the vehicle in which the at least one auxiliary power take-off 10 is active and the vehicle is being operated at a minimum driving speed lower than a driving speed limit, the drive machine 2 is controlled or regulated by the control unit 12 as a function of the auxiliary power take-off torque characteristic 20 as the operating situation dependent torque characteristic.

In such a case it is further differentiated whether in the operating situation of the vehicle in which the at least one auxiliary power take-off is active, the driving speed is zero, in which case the drive machine 2 is controlled or regulated as a function of the auxiliary power take-off torque characteristic 20, using a reduction factor.

If there occurs one of the operating situations in which the drive machine 2 is controlled or regulated in accordance with the transport torque characteristic 19 or the auxiliary power take-off torque characteristic 20, the design and dimensions of the vehicle transmission 3 impose a power restriction which limits the supply of additional power by the drive machine 2. The gearwheels and bearings at least of the lowest gear limit the input power of the vehicle transmission 3. To optimize the additional power that can be delivered, according to the invention it is provided that the additional power supplied is controlled or regulated as a function of operating situation dependent torque characteristics 18, 19a to 19d, 20a to 20d, which are called up depending on the synchronous gear selected at the time. To each of the four synchronous gears is assigned a specific torque characteristic 19a to 19d or 20a to 20d, with reference to which the drive machine 2 is controlled or regulated in an operating situation that deviates from normal operation and in which additional power has to be supplied. By virtue of the present invention it is ensured that when additional power is called for, then in each synchronous gear selected just so much power is delivered by the drive machine 2 and transmitted to the vehicle transmission 3 as each individual synchronous gear can at most transmit having regard to its dimensions. Thus, for example, the circumstance is taken into account that in the lower gears, owing to the high gear ratio, a very high torque could be transmitted, but for reasons of space the gearwheels etc. of the first and often the second synchronous gear cannot be made arbitrarily large in order to transmit all of the motor power available at every operating point.

Figure 3:
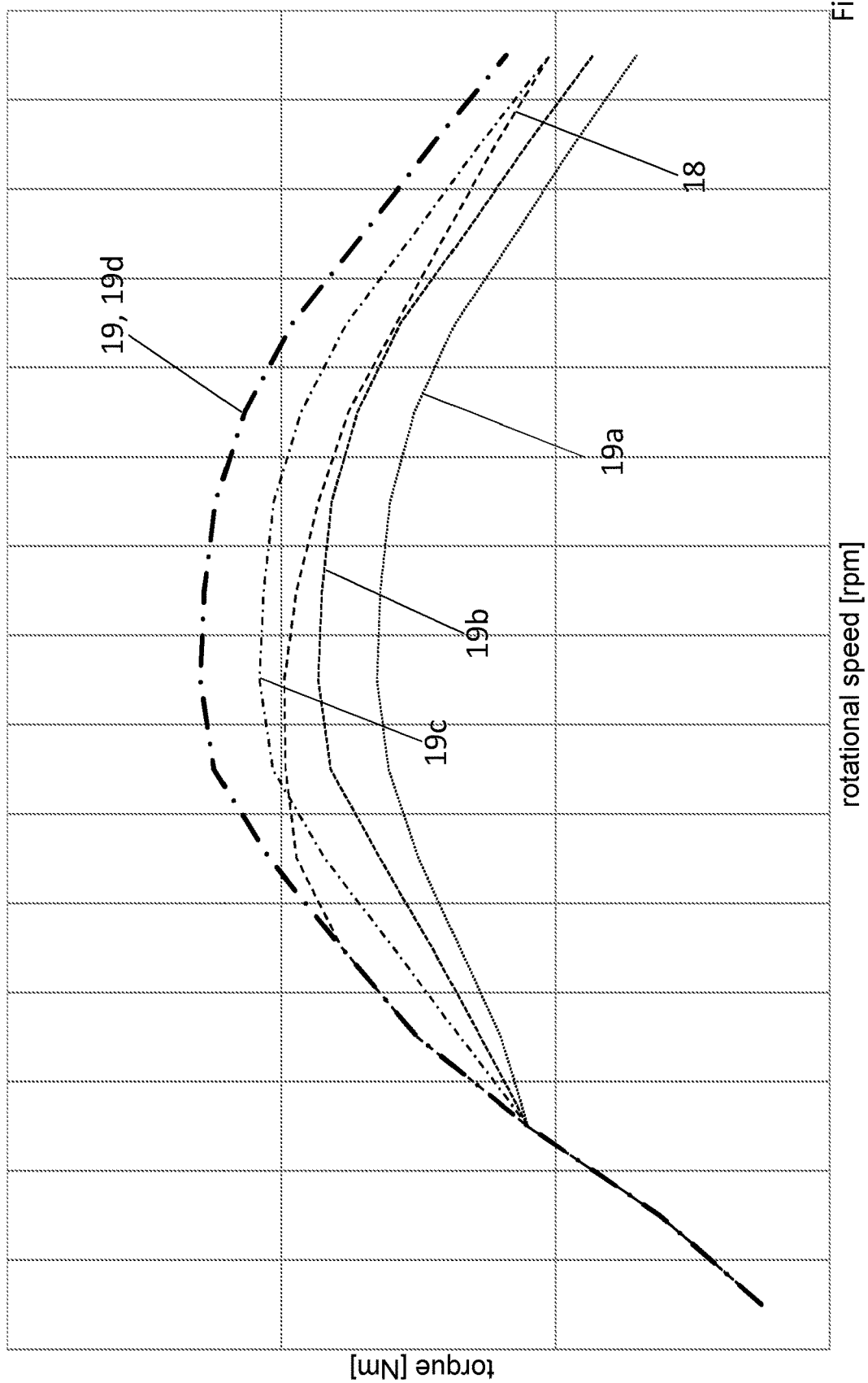
FIG. 3: As an example, a diagram showing gear-specific transport torque characteristics.

As examples, this is explained in greater detail with reference to FIGS. 3 and 4. FIG. 3 shows as an example a diagram of gear-specific transport torque characteristics 19a, 19b, 19c, 19d and FIG. 4 as an example a diagram of gear-specific auxiliary power take-off torque characteristics 20a, 20b, 20c, 20d, each of which is stored in and can be called up from the memory unit of the control unit 12. As a reference, in FIGS. 3 and 4 the normal torque characteristic 18 is indicated, which is used regardless of the gear selected, for the control or regulation of the drive machine 2 by the control unit 12 when no additional power is called for when the auxiliary power take-off 10 is operated or when a transport journey at high speed is called for.

The gear-specific allocation provides that in an operating situation in which, for the control of the drive machine 2, one of the transport torque characteristics 19a to 19d is used, when the first synchronous gear is selected the transport torque characteristic 19a is called up from the memory unit 15. Correspondingly, if the second synchronous gear is selected the transport torque characteristic 19b, if the third synchronous gear is selected the transport torque characteristic 19c and if the fourth synchronous gear is selected the transport torque characteristic 19d is called up. The course of the transport torque characteristic 19d corresponds to that of the transport characteristic 19 in FIG. 2 and describes the maximum torque that can be transmitted. By virtue of the gear-specific assignment of the transport torque characteristics 19a to 19d, the drive machine 2 supplies an additional power matched to the performance capability of the gear of the vehicle transmission 3 concerned. In that way the vehicle can be operated at the limit of its power in any operating condition without overloading the components of the vehicle transmission 3.

Figure 4:
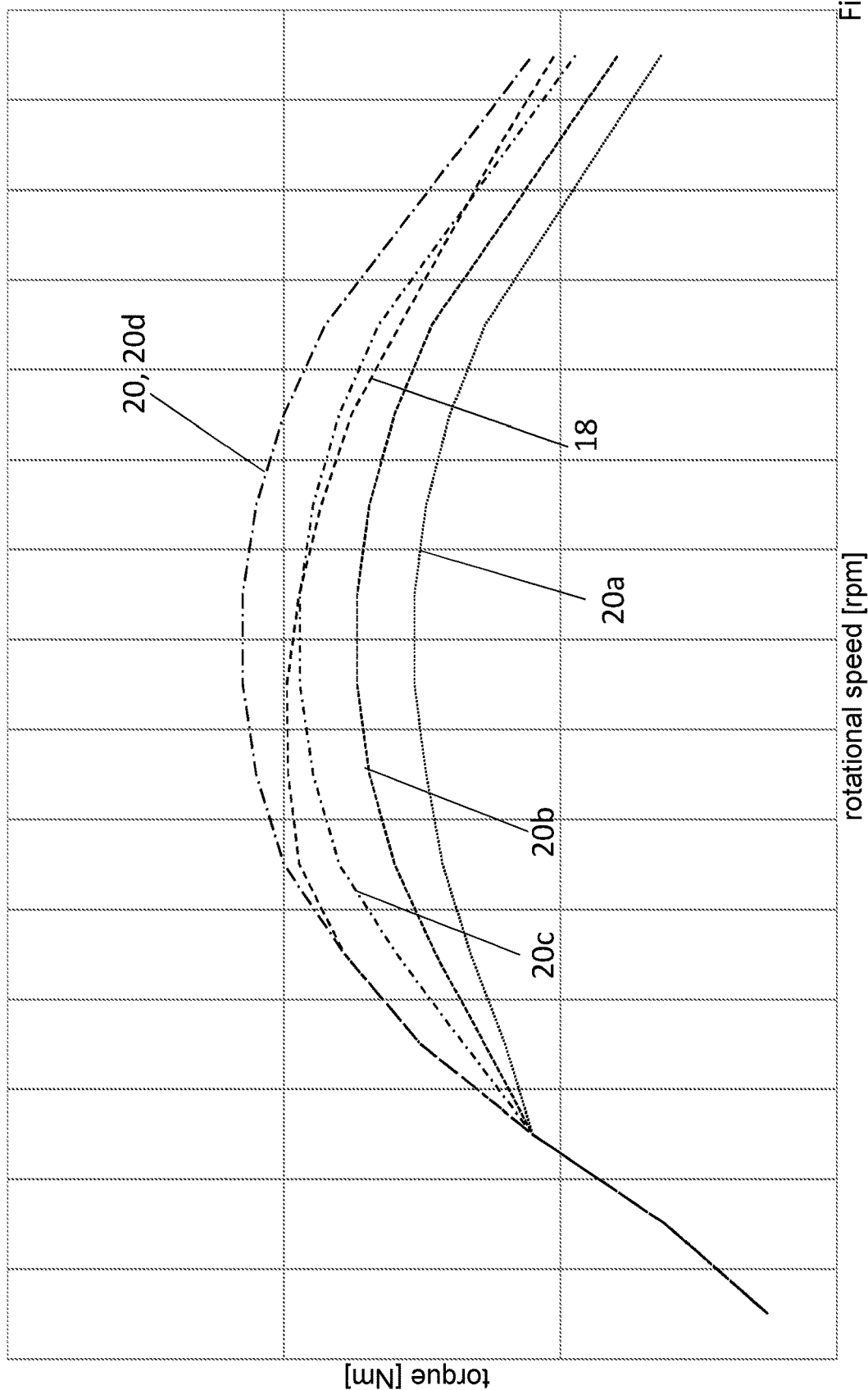
FIG. 4: As an example, a diagram showing gear-specific auxiliary power take-off torque characteristics.

FIG. 4 is based on the operating situation in which, for the control of the drive machine 2, one of the gear-specific auxiliary power take-off torque characteristics 20a to 20d is used. The gear-specific allocation is analogous to the allocation of the transport torque characteristics 19a to 19d to the four synchronous gears. Here too, the course of the auxiliary power take-off torque characteristic 20d of the fourth synchronous gear corresponds to the course of the auxiliary power take-off torque characteristic 20 in FIG. 2.

As already mentioned earlier, it is also differentiated whether when the auxiliary power take-off 10 is active the vehicle is moving or at rest. When the vehicle is at rest, the vehicle transmission 3 is controlled or regulated in a gear-specific manner as a function of the corresponding auxiliary power take-off torque characteristic 20a, 20b, 20c 20d, using a reduction factor. The reduction factor takes into account the different lubrication behavior, in that the respective maximum torque that can be transmitted in accordance with the auxiliary power take-off torque characteristics 20a, 20b, 20c, 20d is reduced.

In general each synchronous gear of the vehicle transmission 3 can be extended by at least one powershiftable gear. To be able to control the provision of power in the form of its supply by the drive machine 2 in an even more precise and detailed manner, a number of gear-specific torque characteristics, i.e. transport torque characteristics and auxiliary power take-off torque characteristics, the number being increased by a factor corresponding to the number of powershiftable gears, are stored in and can be called up from the memory unit 15 of the control unit 12, whereby the gear-specific provision of operating situation dependent additional power by the drive machine 2 can be adjusted more precisely.

INDEXES

1 Drive-train
2 Drive machine
3 Vehicle transmission
4 Input shaft
5 Output shaft
6 Output shaft
7 Differential
8 Drive axle
9 Wheel drive
10 Auxiliary power take-off
11 Sensor
12 Control unit
13 Sensor signal
14 Computer unit
15 Memory unit
16 Control signal
17 Motor characteristic
18 Normal torque characteristic
19 Transport torque characteristic
19a Transport torque characteristic
19b Transport torque characteristic
19c Transport torque characteristic
19d Transport torque characteristic
20 Auxiliary power take-off torque characteristic
20a Auxiliary power take-off torque characteristic
20b Auxiliary power take-off torque characteristic
20c Auxiliary power take-off torque characteristic
20d Auxiliary power take-off torque characteristic

The invention claimed is:

1. A method for operating a drive-train of a vehicle having at least one drive machine, a vehicle transmission with at least two gears, at least one drive axle and at least one auxiliary power take-off, the method comprising:
   either controlling or regulating a normal power, as a function of a normal torque characteristic, supplied from the drive machine; and
   supplying additional power to at least one of the at least one drive axle and the at least one auxiliary power take-off depending on an operating situation of the vehicle, and the supplied additional power being either controlled or regulated as a function of operating situation dependent torque characteristics which are dependent on a currently selected gear.

2. The method according to claim 1, further comprising monitoring, for the operating situation dependent supply of the additional power, activation of the at least one auxiliary power take-off and a driving speed of the vehicle.

3. The method according to claim 1, further comprising, in an operating situation of the vehicle in which the at least one auxiliary power take-off is inactive and the vehicle is being operated at a driving speed below a driving speed limit, either controlling or regulating the drive machine as a function of the normal torque characteristic.

4. The method according to claim 1, further comprising, in an operating situation of the vehicle in which the at least one auxiliary power take-off is inactive and the vehicle is being operated at a driving speed above a driving speed limit, either controlling or regulating the drive machine as a function of a gear-specific transport torque characteristic as the operating situation dependent torque characteristic.

5. The method according to claim 1, further comprising, in an operating situation of the vehicle in which the at least one auxiliary power take-off is active and the vehicle is being operated at a driving speed below a driving speed limit, either controlling or regulating the drive machine as a function of a gear-specific auxiliary power take-off torque characteristic as the operating situation dependent torque characteristic.

6. The method according to claim 5, further comprising, in an operating situation of the vehicle in which the at least one auxiliary power take-off is active and the vehicle is being operated at a driving speed of zero, either controlling or regulating the drive machine as a function of a gear-specific auxiliary power take-off torque characteristic using a reduction factor.

7. The method according to claim 1, further comprising selecting a gear from at least two synchronous gears and at least two powershiftable gears of the vehicle transmission; and upon selection of the gear, using an operating situation dependent, gear-specific torque characteristic for the control or the regulation of the drive machine.

8. A control unit for controlling a drive-train of a vehicle having at least one drive machine, a vehicle transmission with at least two gears, at least one drive axle and at least one auxiliary power take-off, the drive machine supplying a normal power which the control unit either controls or regulates as a function of a normal torque characteristic, the drive machine supplying additional power, depending on an operating situation of the vehicle, to at least one of the at least one drive axle and the at least one auxiliary power take-off, and the control unit being designed to control or regulate the supplied additional power as a function of operating situation dependent torque characteristics which are used by the control unit depending on the gear selected.

9. The control unit according to claim 8, wherein the control unit is designed to carry out a method including either controlling or regulating the normal power, as a function of the normal torque characteristic, supplied from the drive machine; and supplying the additional power to the at least one of the at least one drive axle and the at least one auxiliary power take-off depending on the operating situation of the vehicle, the supplied additional power being either controlled or regulated as the function of the operating situation dependent torque characteristics which are used by the control unit depending on a currently selected gear; and monitoring, for the operating situation dependent supply of the additional power, activation of the at least one auxiliary power take-off and a driving speed of the vehicle.

10. A computer program product with program code means for carrying out a method for operating a drive-train of a vehicle, which has at least one drive machine, a vehicle transmission with at least two gears, at least one drive axle and at least one auxiliary power take-off, when the computer program product is running on a computer or on a corresponding computer unit, the method including either controlling or regulating a normal power, as a function of a normal torque characteristic, supplied from the drive machine; and supplying additional power to at least one of the at least one drive axle and the at least one auxiliary power take-off depending on an operating situation of the vehicle, the supplied additional power being either controlled or regulated as a function of operating situation dependent torque characteristics which are dependent on the gear selected at the time.

* * * * *